(12) United States Patent
Wu et al.

(10) Patent No.: US 9,547,140 B2
(45) Date of Patent: Jan. 17, 2017

(54) CONNECTOR FOR PLUG, CONNECTOR AND HEAT CONDUCTION APPARATUS

(71) Applicant: Tyco Electronics (Shanghai) Co. Ltd., Shanghai (CN)

(72) Inventors: Honghao Wu, Shanghai (CN); Alex Cai, Shanghai (CN); Tim Xue, Shanghai (CN); Jason Yang, Shanghai (CN); Helena Sun, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 92 days.

(21) Appl. No.: 14/496,710

(22) Filed: Sep. 25, 2014

(65) Prior Publication Data
US 2015/0087180 A1    Mar. 26, 2015

(30) Foreign Application Priority Data
Sep. 25, 2013    (CN) .......................... 2013 1 0442018

(51) Int. Cl.
*H01R 13/00*    (2006.01)
*G02B 6/42*    (2006.01)

(52) U.S. Cl.
CPC ................... *G02B 6/4269* (2013.01)

(58) Field of Classification Search
CPC ...... H01R 13/533; H01R 12/721; H01R 12/88; H01R 12/724; H01R 13/46; H01R 13/6658
See application file for complete search history.

(56) References Cited

U.S. PATENT DOCUMENTS

| | | | | |
|---|---|---|---|---|
| 4,477,142 A * | 10/1984 | Cooper | .................. | H01R 9/091 439/567 |
| 5,506,751 A * | 4/1996 | Chatel | .................. | H05K 7/1425 361/690 |
| 5,792,677 A * | 8/1998 | Reddy | ................. | H01L 23/3677 257/712 |
| 6,558,191 B2 * | 5/2003 | Bright | .................. | G02B 6/4246 439/541.5 |
| 6,731,519 B1 * | 5/2004 | Hwang | ................ | G02B 6/4277 174/387 |
| 6,972,968 B2 * | 12/2005 | Hwang | ................ | H05K 9/0058 174/383 |
| 7,539,018 B2 * | 5/2009 | Murr | .................. | H05K 7/20418 165/185 |
| 8,223,498 B2 * | 7/2012 | Lima | .................. | H05K 7/20418 361/704 |
| 8,879,262 B2 * | 11/2014 | Shi | ........................... | 165/104.33 |

FOREIGN PATENT DOCUMENTS

CN      IB133094 B      3/2015

* cited by examiner

*Primary Examiner* — Xuong Chung Trans
(74) *Attorney, Agent, or Firm* — Barley Snyder

(57) ABSTRACT

A connector for receiving a plurality of plugs is provided. The connector includes a cage, a plurality of partition plates, a plurality of partition sections, and a heat conduction apparatus. The cage includes a plurality of plug receiving passageways arranged along two rows stacked on top of each other. Each of the plurality of partition plates is positioned between two laterally adjacent plug receiving passageways of the plurality of plug receiving passageways, while each of the plurality of partition sections is positioned between two adjacent plug receiving passageways of the plurality of plug receiving passageways. The heat conduction apparatus penetrates through the plurality of partition sections along a width thereof.

50 Claims, 16 Drawing Sheets

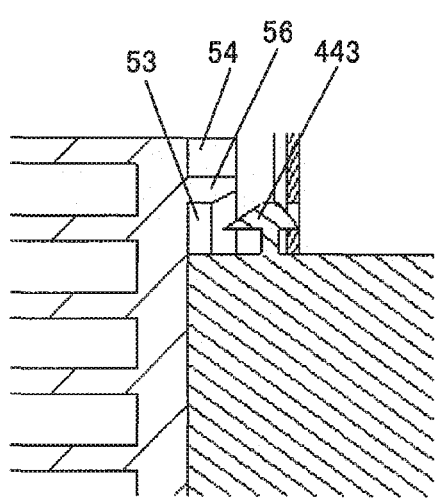
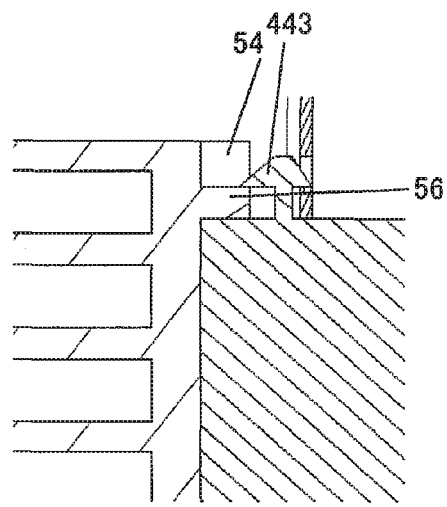
Fig. 25A  Fig. 25B
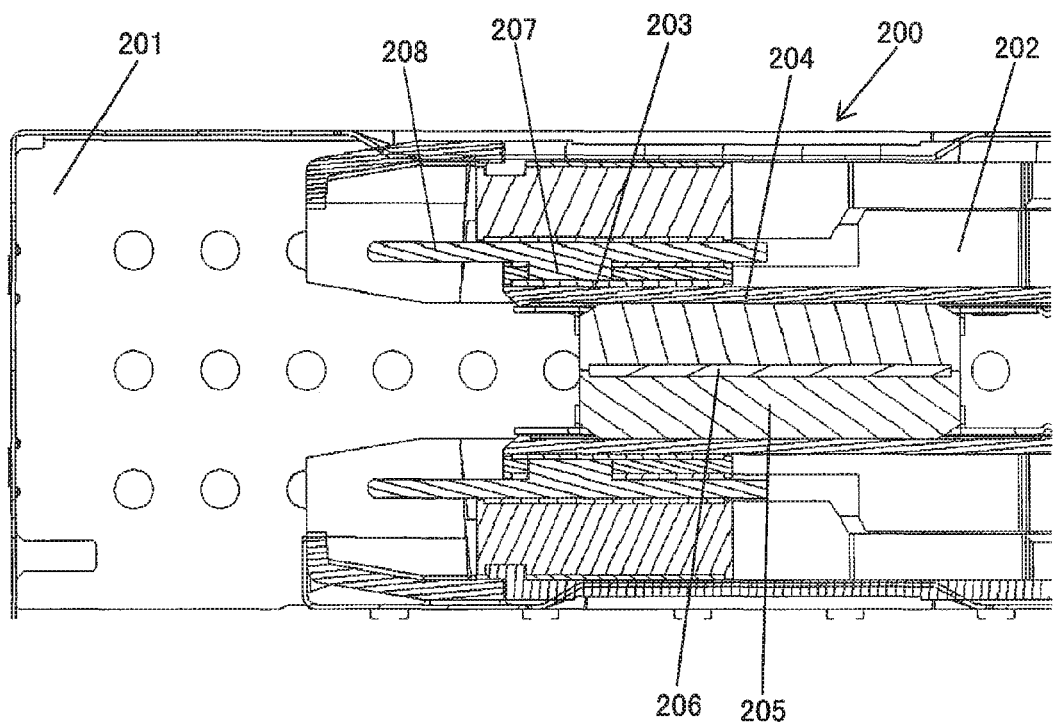
Fig. 26

CONNECTOR FOR PLUG, CONNECTOR AND HEAT CONDUCTION APPARATUS

CROSS-REFERENCE TO RELATED APPLICATIONS

This application claims the benefit of the filing date under 35 U.S.C. §119(a)-(d) of Chinese Patent Application No. 201310442018.2 filed on Sep. 25, 2013

FIELD OF THE INVENTION

The invention relates to an electrical connector and, more particularly, to an electrical connector for receiving a plug with improved heat dissipation performance.

BACKGROUND

Known connectors for photoelectric conversion generally includes a plug, a receptacle mated with the plug, and a connector for receiving the plug and the receptacle. The plug generally includes a photoelectric chip for converting an optical signal from an external optical fiber to an electrical signal. The receptacle is mounted in the connector and engaged with the plug inserted into the connector. In the plug, the photoelectric chip is mounted in a protection case thereof. The photoelectric chips generate heat in use, increasing the temperature of the photoelectric chips and deteriorating the photoelectric conversion performance of the photoelectric chips.

A known connector having two sets of plug and receptacle is disclosed in Chinese Patent Application No. 201310435626.0 and shown in FIG. 26. The known connector 200 is a SFF connector arranged in 2 rows and 1 column (2*1). The known connector 200 includes a cage 201 made of, for example, metal material and divided into two receiving passageways arranged in upper and lower direction, in left side of each of which the receptacle connector (not shown) is installed. The plug 202 includes a photoelectric chip 207 for converting an optical signal from an external optical fiber to an electrical signal, a circuit board 208 for mounting the photoelectric chip 207, a protection case 204 for mounting the circuit board 208, and a heat conduction pad 203 provided between the photoelectric chip 207 and the protection case 204. The plug 202 is inserted from the right side of the receiving passageway, and the circuit board 208 of the plug is connected to the respective circuit board of the receptacle, so as to accomplish the electrical connection between the plug and the receptacle. A partition for partitioning the two receiving passageways and supporting the plug 202 is provided between two plugs 202. Two heat conduction blocks 205 and a heat conduction pad 206 provided between the two heat conduction blocks 205 are provided in the partition, so as to form a heat conduction apparatus with a sandwich-like structure, and dissipate the heat generated by the photoelectric chip in the protection case 204 to the outside of the cage 201 by the cage 201, and thus reducing the temperature of the photoelectric chip.

The known connector 200 includes a 2 row and 1 column configuration. When an upper plug is inserted, while a lower plug is not inserted, the heat conduction pad 206 lacks a surface-contact force between the heat conduction apparatus with the sandwich-like structure and the protection case of the plug is relatively small, and thus the thermal contact resistance is increased.

SUMMARY

The invention has been made to overcome or alleviate at least one aspect of the above mentioned disadvantages, among others.

According to the invention, a connector for receiving a plurality of plugs is provided. The connector includes a cage, a plurality of partition plates, a plurality of partition sections, and a heat conduction apparatus. The cage includes a plurality of plug receiving passageways arranged along two rows stacked on top of each other. Each of the plurality of partition plates is positioned between two laterally adjacent plug receiving passageways of the plurality of plug receiving passageways, while each of the plurality of partition sections is positioned between two adjacent plug receiving passageways of the plurality of plug receiving passageways. The heat conduction apparatus penetrates through the plurality of partition sections along a width thereof.

BRIEF DESCRIPTION OF THE DRAWINGS

The above and other features of the invention will become more apparent by describing in detail exemplary embodiments thereof with reference to the accompanying drawings, in which:

FIG. 25A is a schematic view of the connection of the heat dissipation device and the heat conduction body, with a second bard of the heat conduction body being not positioned in the location portion of the heat dissipation device;

FIG. 25B is another schematic view of the connection of the heat dissipation device and the heat conduction body, with the second bard of the heat conduction body being positioned in the location portion of the heat dissipation device; and FIG. 26 is a cross-sectional view of a known connector having two sets of plug and receptacle.

DETAILED DESCRIPTION OF THE EMBODIMENT(S)

Figure 1:
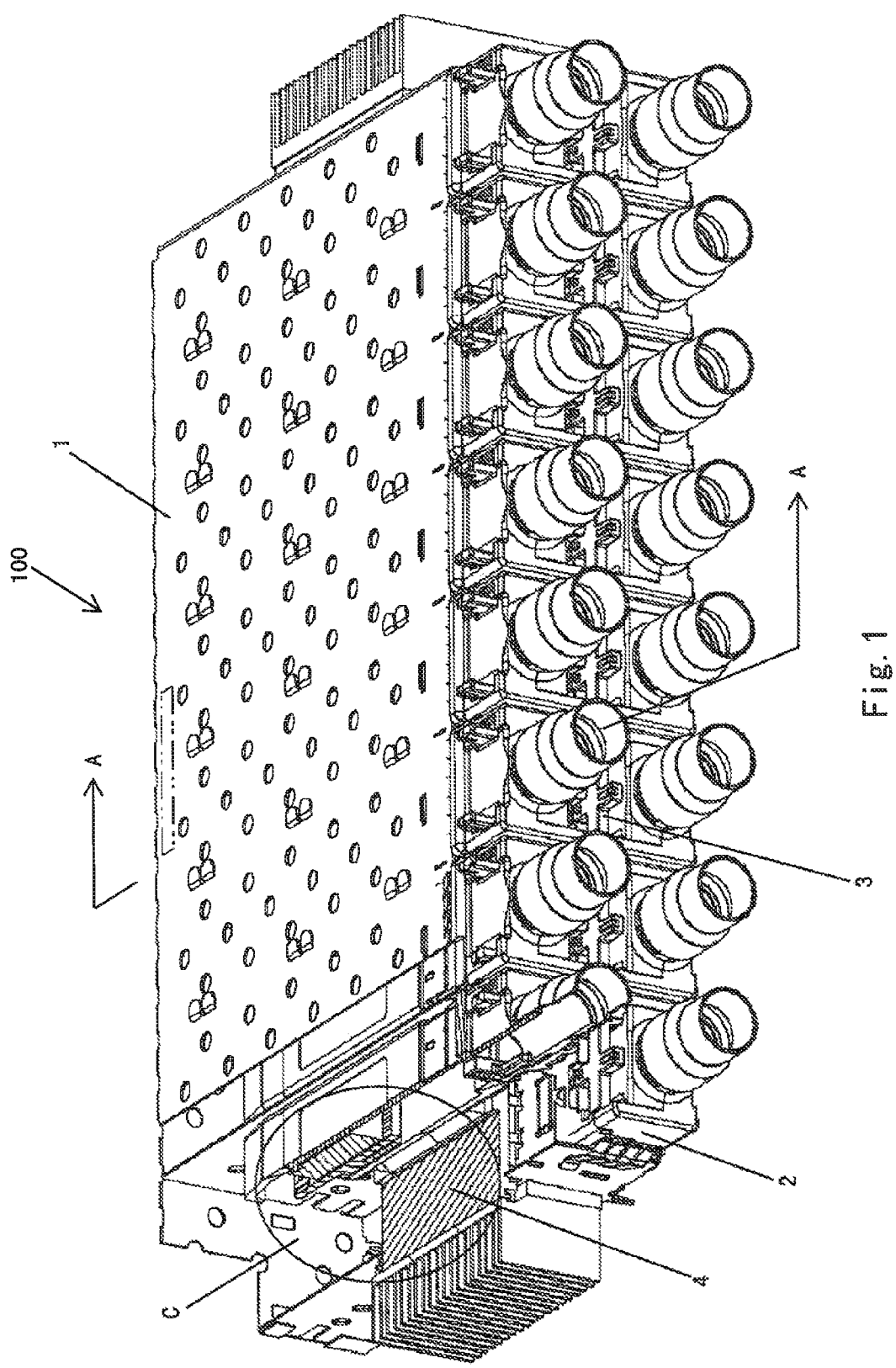
FIG. 1 is a perspective view of a connector according to the invention.
Figure 2:
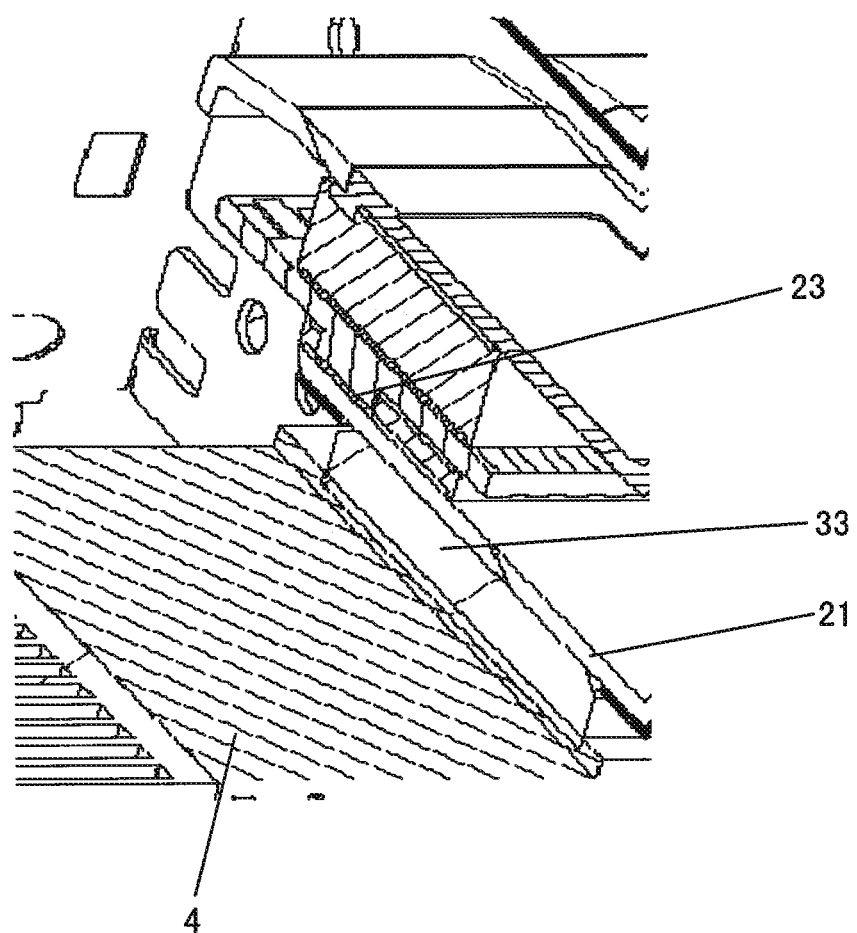
FIG. 2 is an enlarged view of the C part of FIG. 1.
Figure 3:
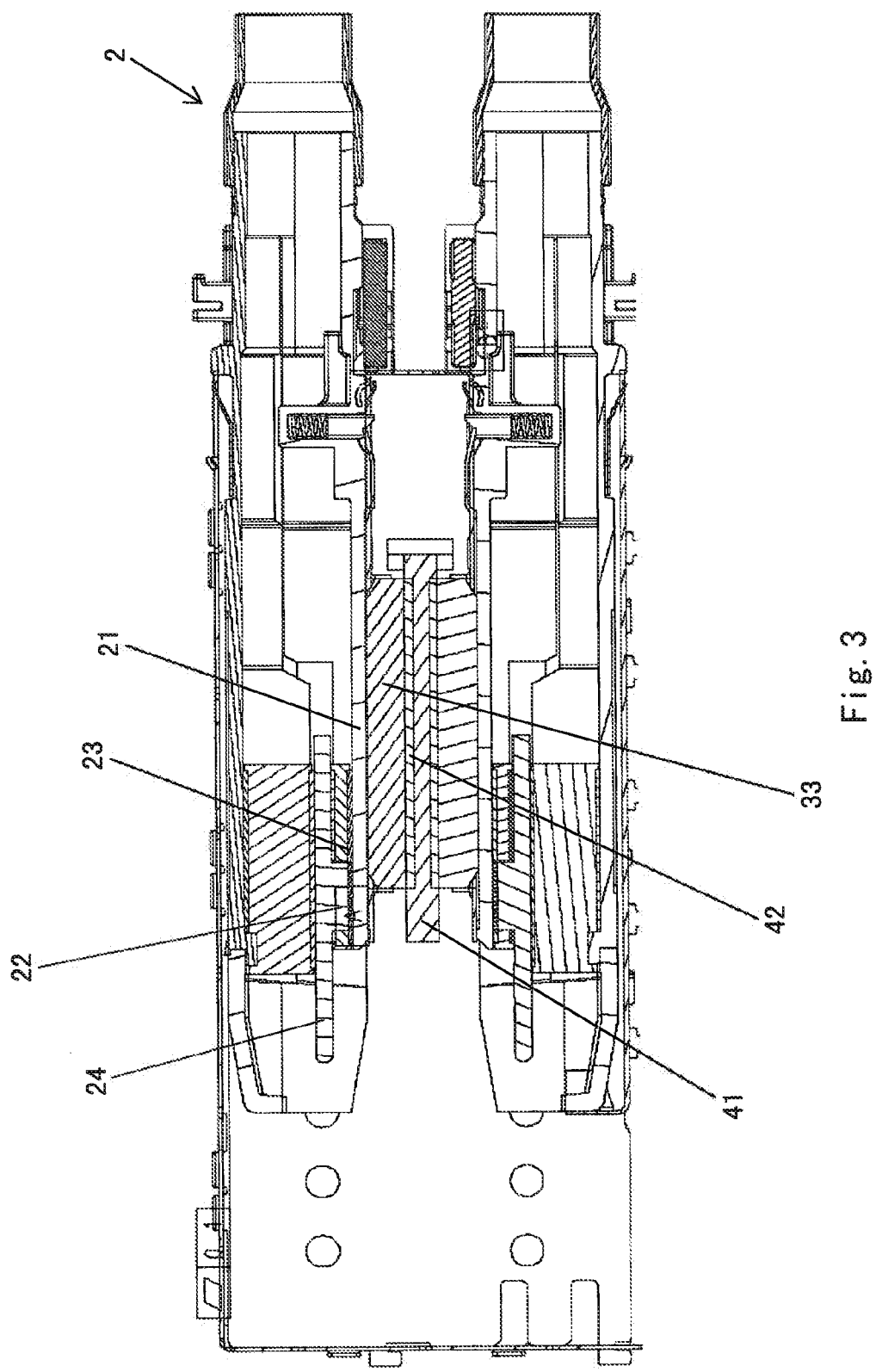
FIG. 3 is a cross-sectional view of the connector taken along line A-A of FIG. 1.

Although exemplary embodiments of the present disclosure will be described hereinafter in detail with reference to the attached drawings, before the description, however, it should be appreciated that a person skilled in this art may modify the present disclosure and acquire the technical effect of the present disclosure. Thus, it should be appreciated that the following description is a broad teaching for the person skilled in this art and the content thereof is not intended to limit the present disclosure to the embodiment set forth herein.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
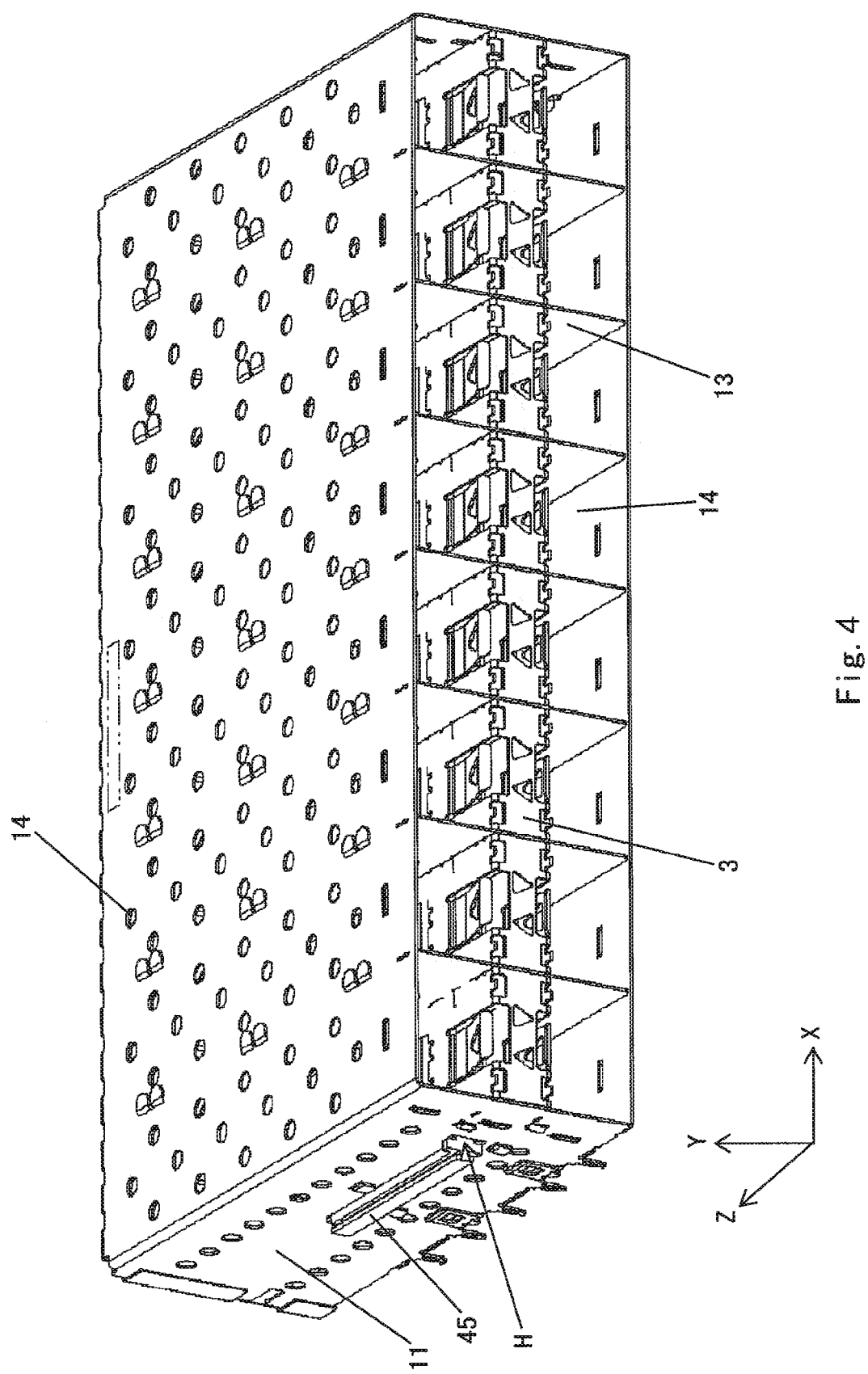
FIG. 4 is a perspective view of the connector of FIG. 1, wherein a heat dissipation device and a plurality of plugs are removed.

Referring to FIG. 1 to 5, according to an exemplary embodiment of the invention, a connector according to the invention is shown for receiving plugs 2 therein. Each plug includes a protection case 21 and a data communication module 22 provided within the protection case and including a photoelectric chip, for example. The connector includes a cage 1 formed of heat-conductive material, for example stainless steel and the like, a plurality of partition sections 3, and at least one heat conduction apparatus 4. The connector also includes a plurality of receptacles (not shown) adapted to mate with the plug 2 and provided along a left side of FIG. 3 (the rear section of FIG. 1). For the sake of understanding, hereinafter, when the cage 1 is positioned as shown in FIG. 4, a lateral direction or a left-right direction thereof is indicated by an axis X, a height direction or an up-down direction thereof is indicted by an axis Y, and a longitudinal direction or a front-rear direction thereof is indicated by an axis Z.

In the connector of the invention, the cage 1 is partitioned to a plurality of receiving passageways 14, which are arranged in at least two rows (for example, 2 rows as shown in FIG. 1) in the height direction and at least two columns (for example, 8 columns as shown in FIG. 1) in the lateral direction, and two adjacent receiving passageways 14 of each row along the width is separated by a partition plate 13. A partition section 3 is provided between the two adjacent receiving passageways 14 along a height of the cage 1, and is configured to support the protection case 21 of the respective plug 2. A heat conduction apparatus 4 is provided to pass through the plurality of partition sections 3 along a width of the cage 1, such that a heat conduction path is formed in the lateral direction. Further, each heat conduction apparatus 4 is provided to pass through the two opposite sidewalls 11 of the cage 1, all the partition plates 13 and all the partition sections 3 along the width and comes into contact with each of the partition sections 3, such that heat conduction will be realized by the heat conduction apparatus 4 to reduce the temperature of the data communication module 22. A plurality of receiving passageways 14 are also provided on each sidewall 11 of the cage 1 in order to facilitate venting inside the cage 1.

According to another aspect of the exemplary embodiment, a connector 100 is provided that includes at least one plug 2. The plug 2 is inserted into one respective receiving passageway 14 of the connector, so as to electrically connect to a receptacle (not shown) provided in the connector. Each of the partition sections 3 of the connector may come into contact with at least one portion of one respective plug.

In the connector 100 of the invention, the number of the plugs 2 may be equal to or less than that of the receiving passageways 14 as necessary, and the plugs 2 are provided in the receiving passageways 14, respectively. Each of the plugs 2 may include a data communication module 22, a circuit board 24 for mounting the data communication module 22, a protection case 21 for mounting the circuit board 24, and a heat conduction pad 23 provided between the data communication module 22 and the protection case 21. In one embodiment, the data communication module 22 includes a photoelectric chip for converting an optical signal from an optical fiber (not shown) to an electrical signal. Each of the partition sections 3 comes into contact with the respective protection case 21, such that a heat conduction path is formed by the data communication module 22, the heat conduction pad 23, the protection case 21, the partition sections 3 and the heat conduction apparatus 4, and the heat generated by the data communication module 22 may be transferred to the heat conduction apparatus 4.

Figure 5:
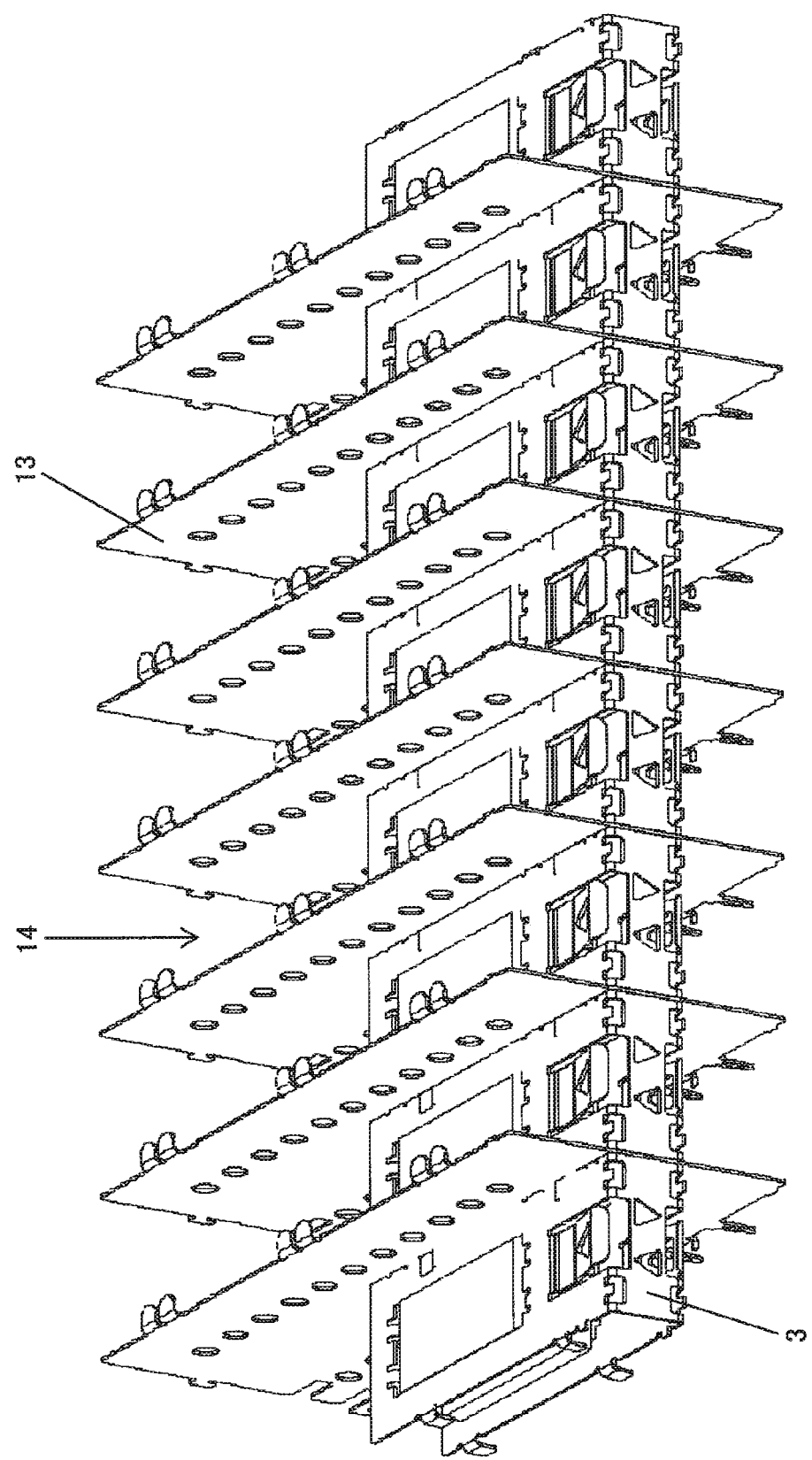
FIG. 5 is a perspective view of partitions and partition plates in the connector of FIG. 1.
Figure 6:
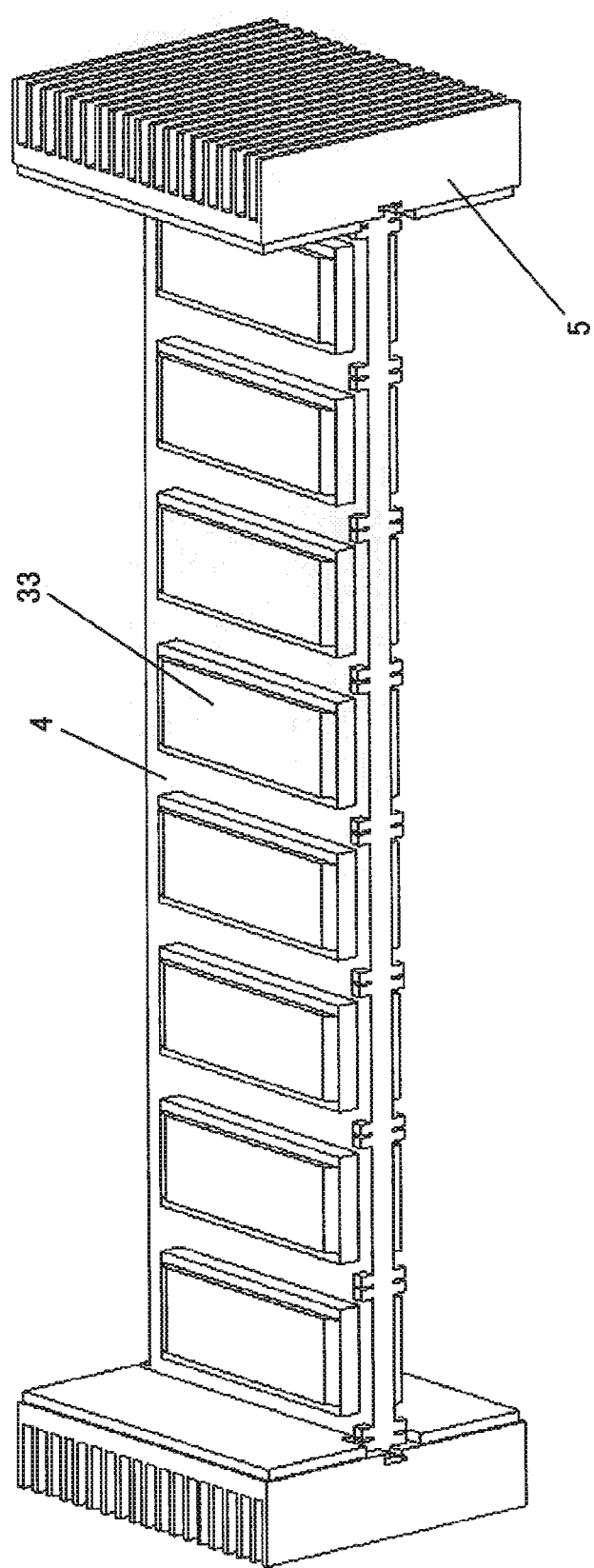
FIG. 6 is a perspective view of a heat dissipation assembly of the connector of FIG. 1.
Figure 7:
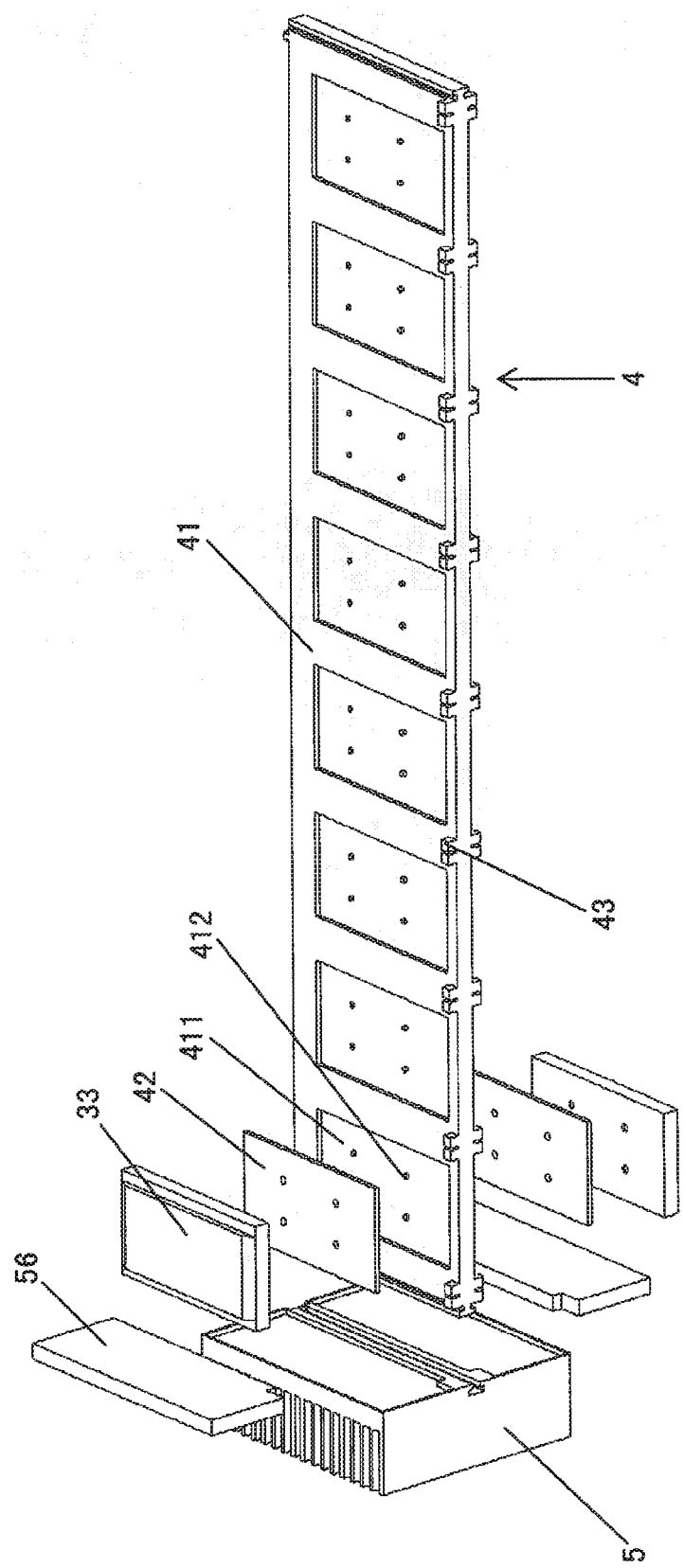
FIG. 7 is an exploded view of the heat dissipation assembly of FIG. 6.
Figure 8:
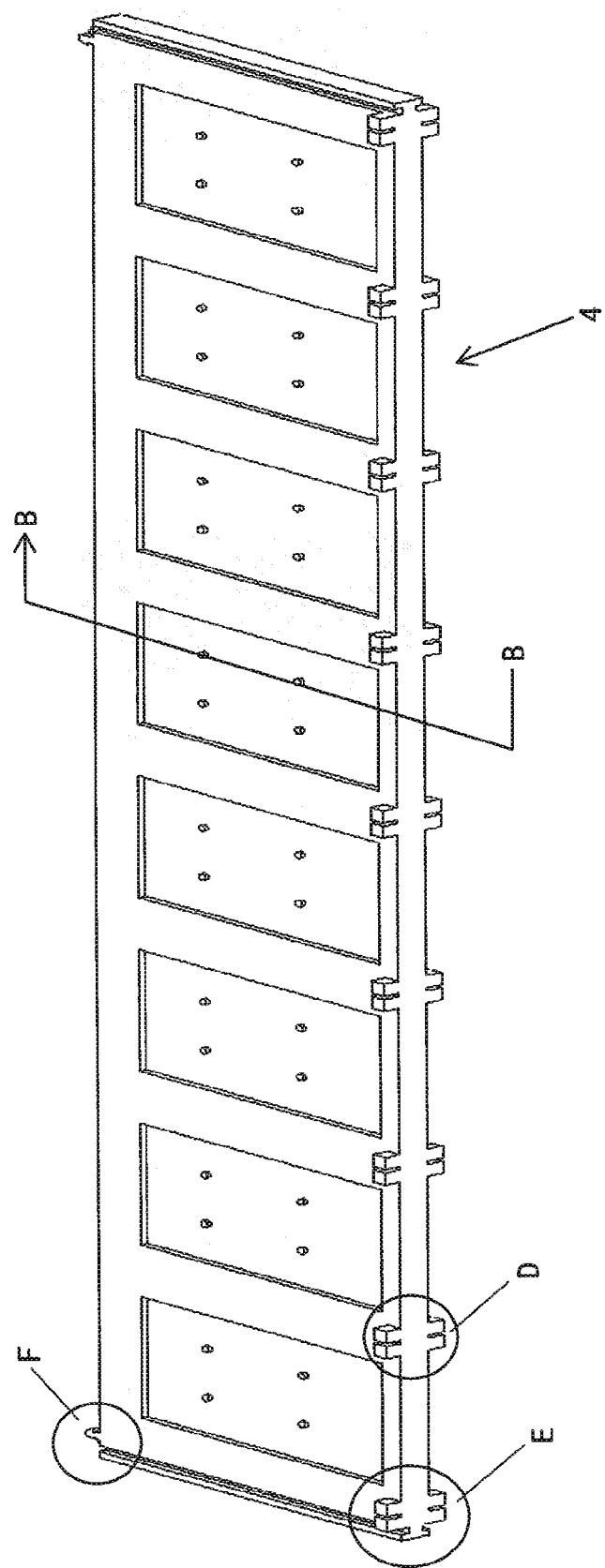
FIG. 8 is a perspective view of a heat conduction apparatus according to the invention.

In the connector 100 according to an embodiment of the invention, each heat conduction apparatus 4 includes a heat conduction body 41 made of a metal sheet, for example, an aluminum sheet, a copper sheet, and a stainless steel sheet, and a plurality of heat conduction pads 42. The heat conduction body 41 is arranged such that it extends along the width and penetrates through a plurality of partition sections 3. Specifically, the heat conduction body 41 penetrates through the two opposite sidewalls 11 of the cage 1, all the partition plates 13 and all the partition sections 3. Each heat conduction pad 42 is configured to engage both upper and lower sides of the heat conduction body 41 and come into contact with a portion of one respective partition section 3. As shown in FIGS. 1, 4 and 5, in the case of 8 columns receiving passageways 14, sixteen (2*8) heat conduction pads 42 are provided on the upper and lower sides of the heat conduction body 41. In one exemplary embodiment, the heat conduction pad 42 is made of rubber material doped with metal particle, wherein the rubber material may provide elasticity for the heat conduction pads, and the metal particle, such as aluminum, copper and stainless steel particles and like, however, may provide improved heat conductivity for the heat conduction pads 42. The heat conduction pads may also be made of the chemical polymer having heat conductivity and elasticity.

Furthermore, referring to FIG. 6-11C, the heat conduction body 41 has a substantially rectangular shape, and includes a plurality of receiving grooves 411 formed along the upper and lower sides of the heat conduction body 41, respectively. Each of the heat conduction pads 42 is compressed into one respective receiving groove 411. More particularly, each of the receiving grooves 411 is provided with a plurality of ribs 412, each mounted with a resilient member (not shown). Each of the heat conduction pads 42 is provided with a plurality of engagement holes 421 through which the resilient members pass, respectively. Each heat conduction pad 42 has a thickness less than that of the receiving groove 411. In this way, the heat conduction pads 42 will not go beyond the upper surface of the heat conduction body 41.

In a further exemplary embodiment, the heat conduction apparatus 4 may also include a plurality of connection devices 43, which are configured to engage the heat conduction apparatus 4 to the two respective sidewalls 11 of the cage 1 and all the partition plates 13. In one embodiment, a plurality of connection devices 43 are provided on a first side (the front side of FIGS. 7 and 8) of the heat conduction body 41. Each receiving groove 411 is provided between the two connection devices 43 in the lateral direction, and each of the connection devices 43 is in correspondence to one partition plate 13.

Figures 11A, 11B:
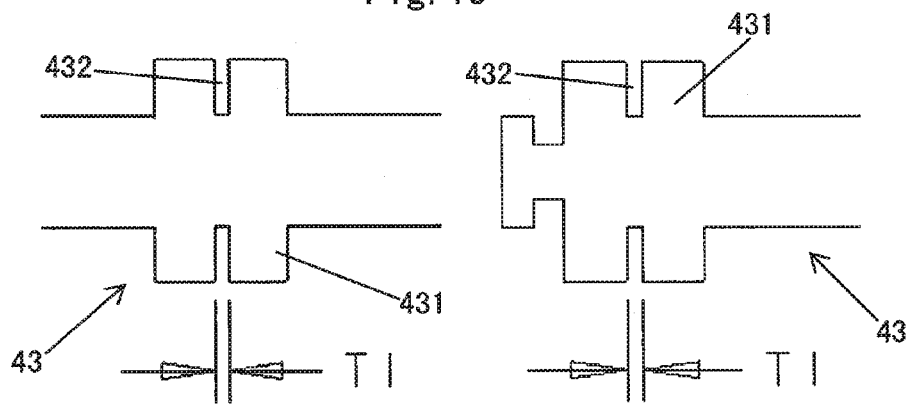
FIG. 11A is an enlarged view of the D part of FIG. 8.
FIG. 11B is an enlarged view of the E part of FIG. 8.
Figure 12:
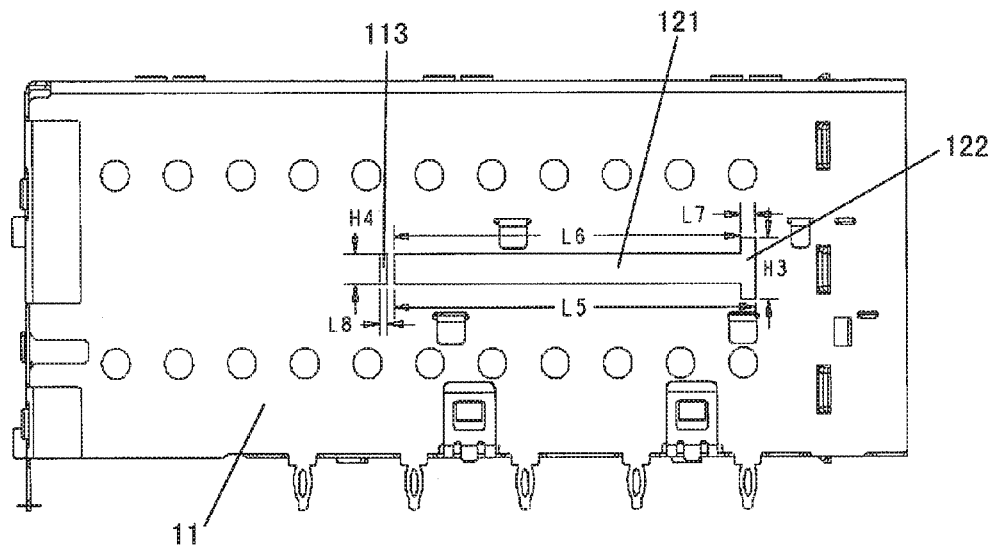
FIG. 12 is a side view of a sidewall of the housing of FIG. 1.
Figure 13:
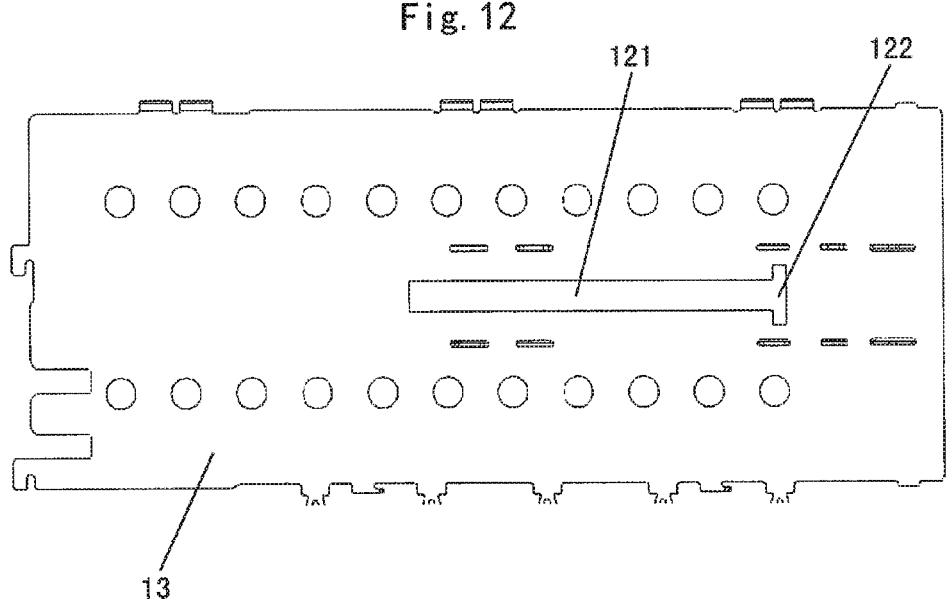
FIG. 13 is a side view of a partition plate of FIG. 5.

Referring to FIGS. 11A and 11B, each of the connection devices 43 includes a protrusion 431 extending along a height and positioned along the first side of the heat conduction body 41, and a positioning slot 432 formed in the protrusion 431. A width T1 of the positioning slot 432 is set to be substantially the same as the thickness of the sidewall 11 or the partition plate 13, such that a portion of the sidewall 11 or the partition plate 13 may be inserted into the positioning slot 432. As shown in FIGS. 12 and 13, a horizontal receiving passageway 121 and a vertical receiving passageway 122 that communicates with the horizontal receiving passageway 121 are formed on at least one of the sidewalls 11 and each of the partition plates 13. In this way, the horizontal receiving passageway 121 and the vertical receiving passageway 122 are configured to be substantially T-shape. The horizontal receiving passageway 121 is configured to allow the heat conduction body 41 to pass through, and the vertical receiving passageway 122 is configured to allow the protrusion 431 to pass through. It may be appreciated that the horizontal receiving passageway 121 and the vertical receiving passageway 122 on the partition plate 13 have substantially the same size as these on the sidewall 11.

As shown in FIG. 12, the horizontal receiving passageway 121 has a length L6, and the vertical receiving passageway 122 has a length L7, and the total length of the both holes is L5=L6+L7. The vertical receiving passageway has a height of H3, and a location portion 113 has a length of L8. The horizontal receiving passageway 121 and the vertical receiving passageway 122 having the same sizes are also provided on the partition plate 13.

Referring to FIGS. 8, 10, 11C, 21A and 21B, the heat conduction apparatus 4 further includes at least one locating device 44, with each comprising an elastic connection portion 441 and a first catch 442. The connection portion 441 protrudes outwards from at least one end of a second side (the back side of FIGS. 7 and 8) opposite to the first side of the heat conduction body 41. The first catch 442 is formed on a free end of the connection portion 441. As shown in FIG. 12, each sidewall 11 of the cage 1 includes a location portion 113 separated from the horizontal receiving passageway 121, and the first catch 442 is configured to engage the location portion 113 from the exterior side of the sidewall 11, so as to prevent the movement of the heat conduction apparatus 4. The horizontal receiving passageway 121 and the location portion 113 both have a height H4. Generally, the location portion is not provided on the partition plates 13.

Figure 9:
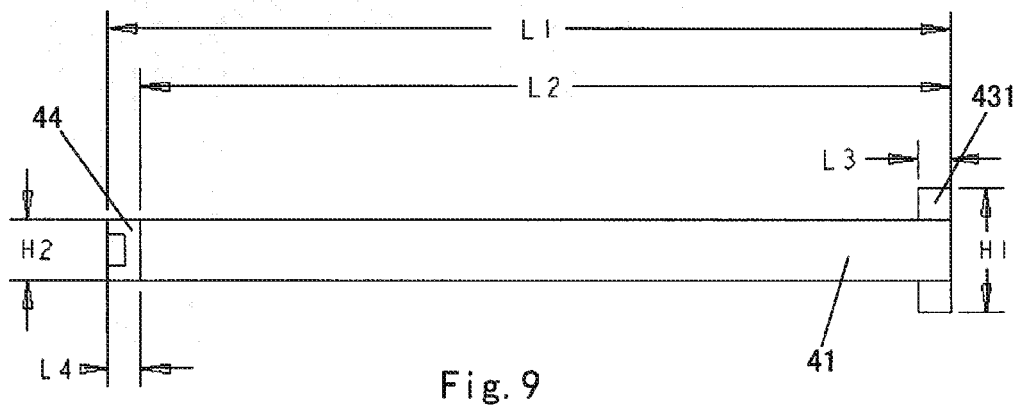
FIG. 9 is a side view of the heat conduction apparatus of FIG. 8.
Figure 10:
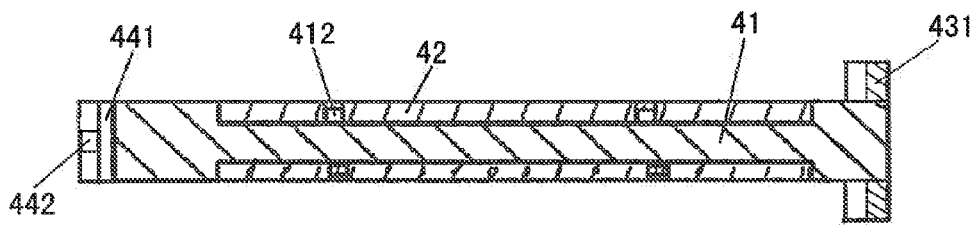
FIG. 10 a cross-sectional view of the heat conduction apparatus taken along line B-B of FIG. 8.

In the side view of the heat conduction apparatus 4, as shown in FIG. 9, the heat conduction apparatus 4 is substantially T-shape. The heat conduction body 41 has a length L2, wherein the protrusion 431 of the connection device 43 has a length L3. The connection device 43 has a height H1. The locating device 44 has a length L4. The locating device 44 and the heat conduction body 41 both have a height H2. The total length of the whole heat conduction apparatus 4 is L1=L2+L4. In order that the heat conduction apparatus 4 may smoothly penetrate the sidewalls 11 and the partition plates 13 and insert into the cage 1, it may be appreciated that the total length L1 of the heat conduction apparatus 4 is equal to or less than the total length L5 of the T-shape hole on the sidewall 11 and the partition plate 13, and the height H1 of the connection device of the heat conduction apparatus 4 and the height H2 of the heat conduction body 41 are equal to or less than the height H3 of the vertical receiving passageway 122 and the height H4 of the horizontal receiving passageway 121, respectively. In addition, the length L3 of the protrusion is equal to or less than the length L7 of the vertical receiving passageway 122 on the sidewall 11 and the partition plate 13.

Referring to FIGS. 3, 7 and FIGS. 17 to 19, in the connector 100 according to an exemplary embodiment, each of the partition sections 3 is substantially U-shape and includes two elastic support arms 31, and are configured to support the plug 2 inserted into the receiving passageway 14 and come into contact with the protection case 21 of the plug 2. The heat conduction apparatus 4 passes through the space between the two support arms 31. The heat generated by the data communication module 22 may be transferred to the heat conduction apparatus 4 by the heat conduction pad 23, the protection case 21 and the partition section 3.

In one embodiment, the partition section 3 may also include two location openings 32 formed on the two support arms 31, respectively; and a heat conduction block 33 made of metal material, for example aluminum, copper and stainless steel and like, wherein the heat conduction block 33 is inserted into the location openings 32 from the interior of the support arms 31. Furthermore, a plurality of location pieces 34 are formed on both front and back sides of the location opening 32, and each of the location pieces 34 extends inward from the edge of the location opening 32. Two steps 331 are formed at two sides (left and right sides) of the heat conduction block 33, and a slope structure is formed on both front and back sides of an upper portion of the heat conduction block 33, so a boss between the two steps is formed on the heat conduction block 33. Both left and right interior edges of the location opening 32 are positioned on the steps 331, and the location pieces 34 abut against a body portion below the slope structure of the heat conduction block 33. In this way, the locations of the front-back direction and the left-right direction of the heat conduction block 33 are defined by the location pieces 34 and both left and right edges of the location opening 32, and the boss of the heat conduction block 33 is allowed to pass through the location opening 32 so as to press the heat conduction pad 42 to contract elastically. Meanwhile, since the elastic coefficient of the elastic component mounted on the rib 412 is larger than that of the heat conduction pad 42, the shrinkage of the heat conduction pad 42 may be reduced, the heat may be more efficiently transferred from the heat conduction block 33 to the heat conduction body 41 by the heat conduction pad 42.

The embodiments that the heat conduction pad 42 is compressed by the heat conduction block 33 and the elastic components contract elastically are described as above, the invention, however, is not limited to the content set forth before. In an alternative embodiment, the protrusions (not shown) protruding outwards may be formed on the two support arms 31, and the heat conduction pad 42 and the elastic component come into contact with the protrusions from the interior of the two support arms 31. When the plug 2 is inserted into the receiving passageway 14, the protection case 21 of the plug 2 press the protrusion, so that the heat conduction pad 42 is compressed. In this way, the opening is not needed to be formed on the support arms, and the heat conduction block may be omitted. Furthermore, the elastic component may be omitted.

Referring to FIGS. 6, 7, 11C, 22-25B, according to an embodiment, the connector 100 may also include at least one heat dissipation device 5 mounted outside of at least one of the two sidewalls 11 and coming into contact with the heat conduction apparatus 4. Furthermore, the heat dissipation devices 5 are installed in at least one side of the heat conduction body 41.

More particularly, the heat dissipation device 5 may include a base portion 51 in the shape of a flat-plate, a plurality of heat dissipation fins 52 provided at a first surface of the base portion 51, and an engagement groove 53 extending along a second surface of the base portion 51. At least one longitudinal side of the heat conduction body 41 is provided with an engagement rail 45, which is configured to slide in the engagement groove 53 in the longitudinal direction and prevents the heat dissipation device 5 from being separated from the heat conduction body 41. In one embodiment, the engagement rail 45 is forked tail shape (or substantially T-shape) and be complementary to the shape of the engagement groove 53, so as to prevent the heat dissipation device 5 from being separated from the heat conduction body 41 in the lateral direction.

Figure 11C:
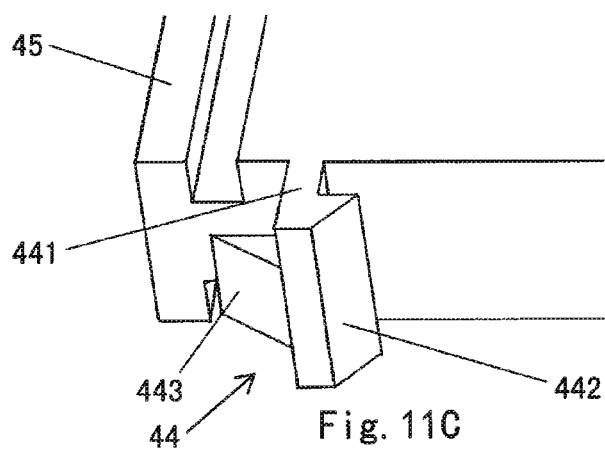
FIG. 11C is an enlarged view of the F part of FIG. 8.
Figure 21A:
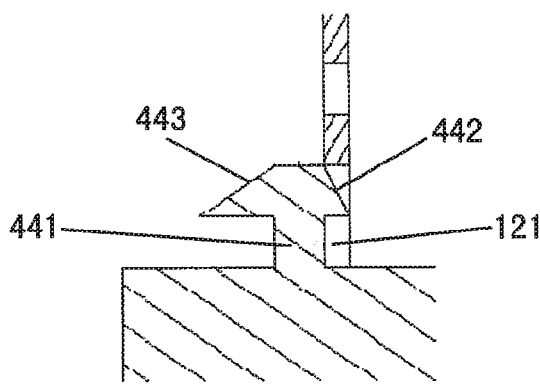
FIG. 21A is a schematic view of the connection of the heat conduction body and the partition plate, with a first bard of the heat conduction body being not positioned in the location portion of the partition plate.
Figure 21B:
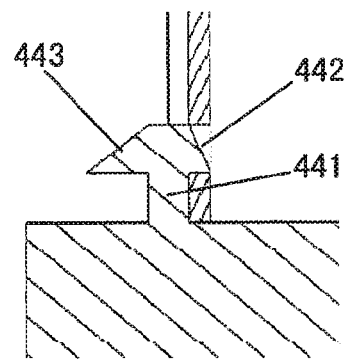
FIG. 21B is another schematic view of the connection of the heat conduction body and the partition plate, with the first bard of the heat conduction body being positioned in the location portion of the partition plate.
Figures 22, 23:
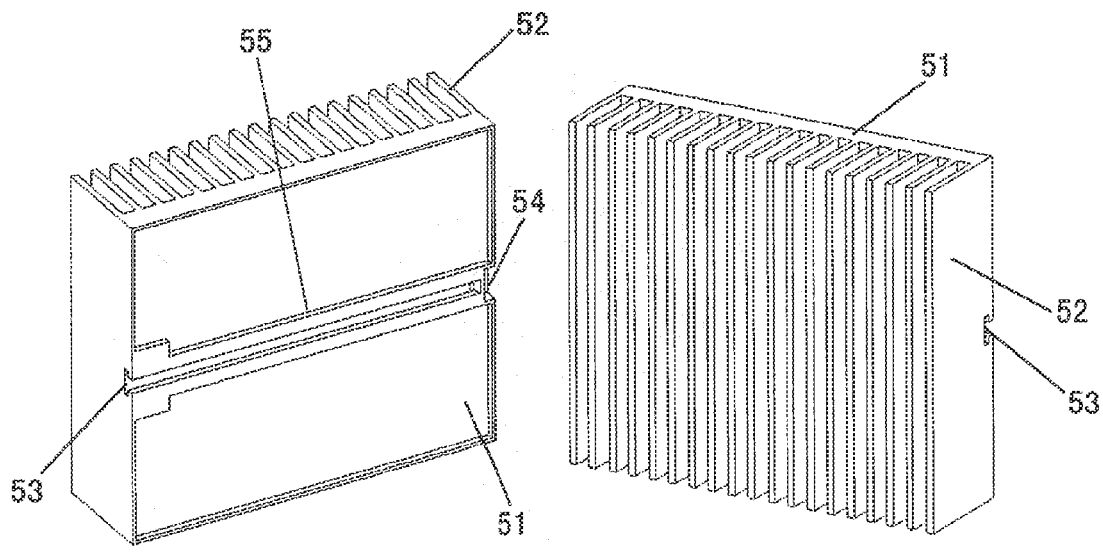
FIG. 22 is a perspective view of a heat dissipation device according to the invention.
FIG. 23 is another perspective view of the heat dissipation device according to the invention.
Figure 24:
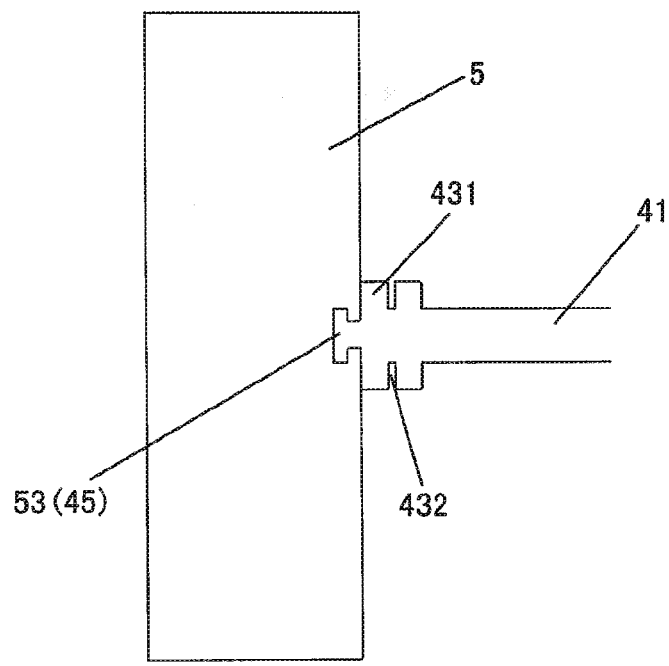
FIG. 24 is a schematic view of connection of the heat dissipation device and the heat conduction body.

Furthermore, the second surface of the base portion 51 of the heat dissipation device 5 is provided with a positioning groove 54 separated from the engagement groove 53 at the longitudinal direction by a partition portion 56. In another aspect, the other side of the free end of the connection portion 441 of the locating device 44 is provided with a second catch 443 (as shown in FIG. 11C), which is configured to enter into the positioning groove 54 and prevent the heat dissipation device 5 from moving along the longitudinal direction. Since the second catch 443 partially inserts into the engagement groove 53 and moves freely in the engagement groove 53, as shown in FIGS. 21A and 21B, the length of the second catch 443 along the width is larger than that of the first catch 442. Thus, the locating device 44 is cantilever shaped and positioned along the backside of the heat conduction body 41.

The upper and lower sides of the engagement groove 53 on the second surface of the base portion 51 are each provided with a receiving groove 55, in which a secondary heat conduction sheet (not shown) is accommodated, and two sides of the secondary heat conduction sheet come into contact with base portion 51 and the exterior of the sidewall 11 of the cage 1, respectively. In one exemplary embodiment, the secondary heat conduction sheet is made of rubber material doped with metal particle, wherein the rubber material may provide elasticity for the secondary heat conduction sheet, the metal particle, such as aluminum, copper and stainless steel particles and like, however, may provide heat conductivity for the secondary heat conduction sheet. The secondary heat conduction sheet may also be made of the chemical polymer having heat conductivity and elasticity. The heat dissipation device 5 may be stably attached to the cage 1 by the secondary heat conduction sheet, and the heat of the sidewall 11 of the cage 1 may be transferred efficiently to the heat dissipation device 5.

Next, an assembly process of the connector 100 of the invention will be described hereinafter with reference to the attached figures.

Figure 17:
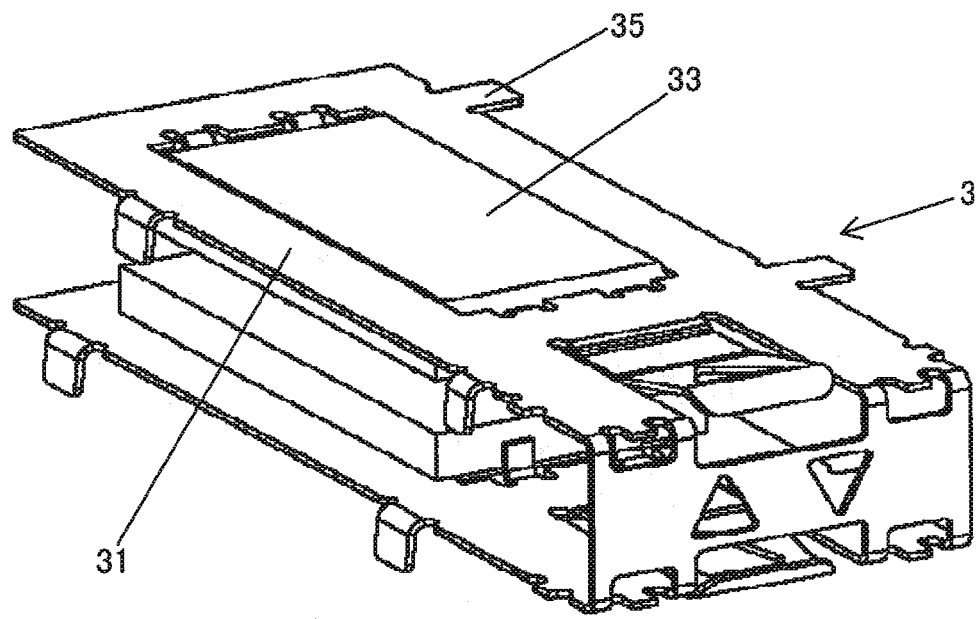
FIG. 17 is a perspective view of a partition according to the invention.
Figure 18:
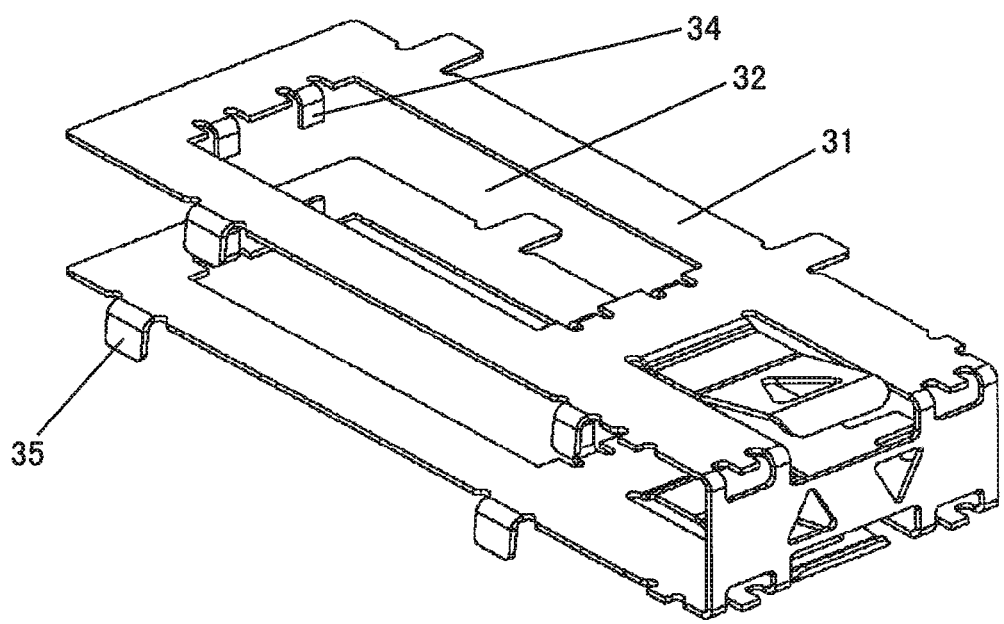
FIG. 18 is a perspective view of the partition of FIG. 17, wherein a heat conduction block is removed.
Figure 19:
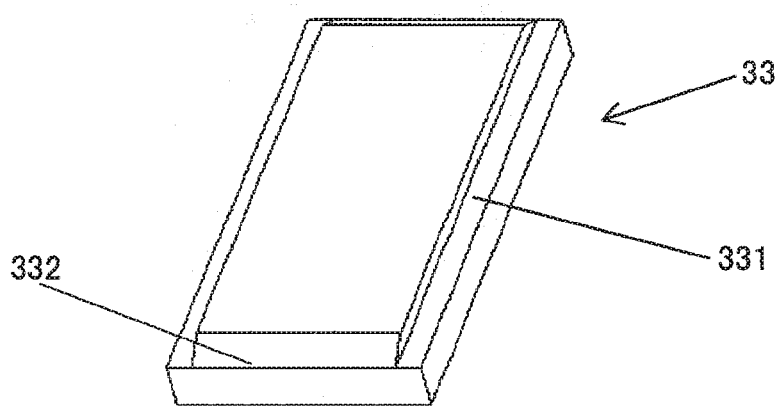
FIG. 19 is a perspective view of the heat conduction block of FIG. 17.

First, referring to FIGS. 17 to 19, two heat conduction blocks 33 are installed to the location openings 32 of two support arms 31 from the interior of the support arms 31 of the partition section 3, with the steps 331 of the heat conduction block 33 resting against the lower edges of the location opening 32. Due to the elastic force of elastic location piece 34, the heat conduction blocks 33 is retained within the location openings 32 of the support arms 31.

Further, in order to prevent the upper heat conduction block 33 from dropping down, a temporary pad may be disposed between the two heat conduction blocks.

Next, referring to FIG. 5, the partition section 3 is installed to the partition plate 13 by the installation elastic pieces 35 on the partition section 3 (FIG. 18), the adjacent partition plates 13 being separated by the partition section 3. Next, the sidewalls 11 of the cage 1 are installed to the partition plates 13.

Figure 14:
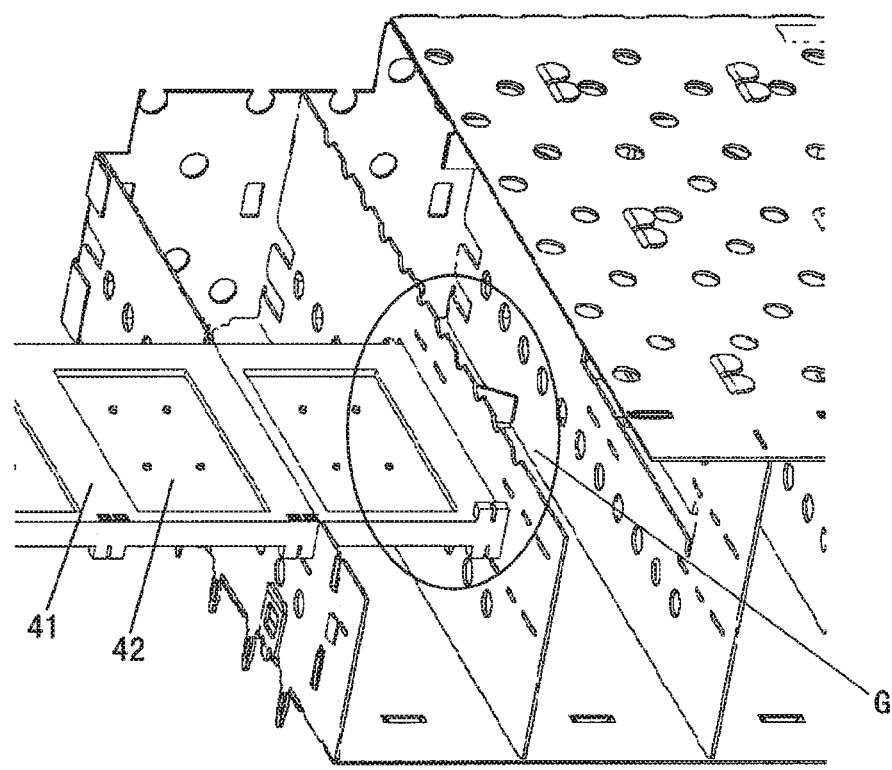
FIG. 14 is a perspective view of connection of the heat conduction apparatus with a partition plate.
Figure 15:
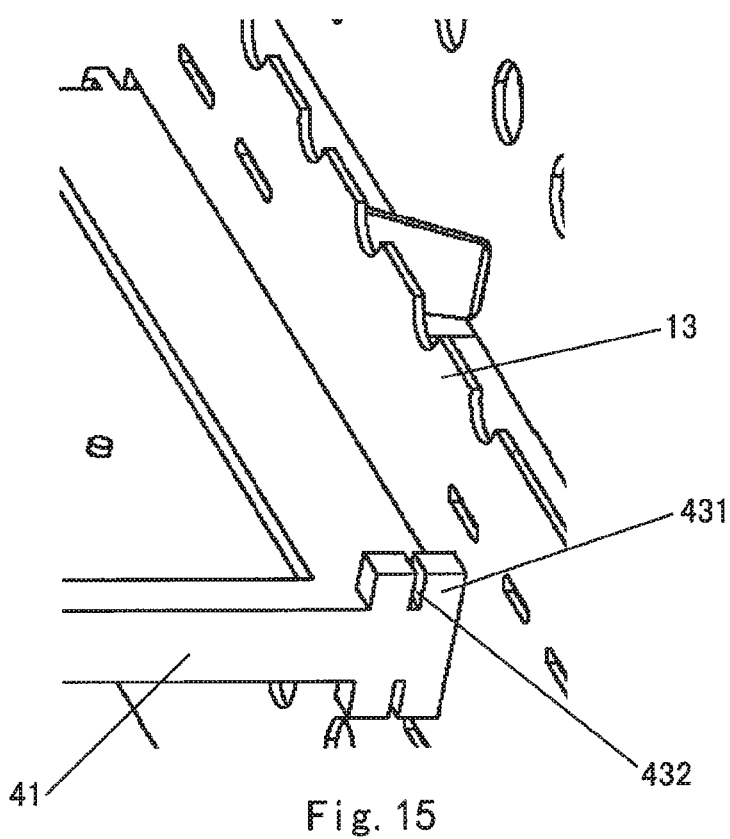
FIG. 15 is an enlarged view of the G part of FIG. 14.

Next, referring to FIGS. 14 and 15, the heat conduction body 41 is inserted into the interior of the cage 1 from the sidewall 11 of the cage 1. More particularly, the body portion of the heat conduction body 41 aligns with the horizontal receiving passageway 121 of the sidewall 11, and the protrusions 431 on the heat conduction body 41 align with the vertical receiving passageway 122, then the whole heat conduction body 41 is horizontally pushed. During the movement of the heat conduction body 41, the heat conduction body 41 will successively enter the space between the support arms 31 of each of partition section 3, and push away the temporary pad between the heat conduction blocks 33, and then the heat conduction pads 42 on both upper and lower sides of the heat conduction body 41 each comes into contact with the two heat conduction blocks 33.

Figure 20A:
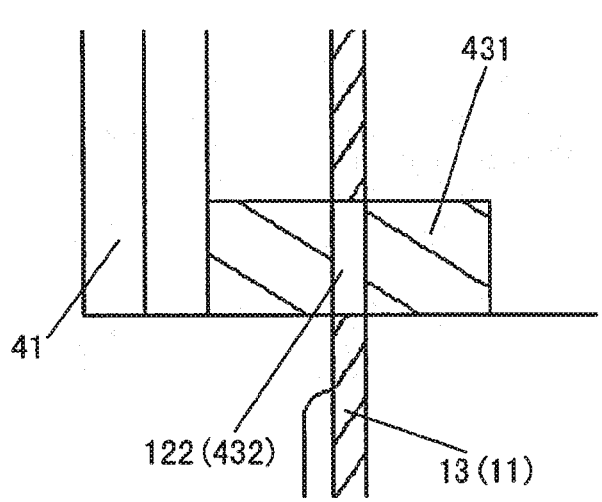
FIG. 20A is a schematic view of a connection between the heat conduction body and the partition plate, with the protrusion of the heat conduction body being positioned in the vertical receiving passageway of the partition plate.

When the heat conduction body 41 is pushed into the proper position, the engagement rails 45 will be exposed along both left and right sidewalls 11. At this time, referring to FIGS. 20A and 21A, the positioning slot 432 between the protrusions 431 of each connection device 43 still aligns with the vertical receiving passageway 122 of the sidewall 11 or the partition plate 13, and the first catch 442 and the connection portion 441 of the locating device 44 is located in the horizontal receiving passageway 121. That is to say, the heat conduction body 41 is still moveable along the width (left-right direction).

Figure 16:
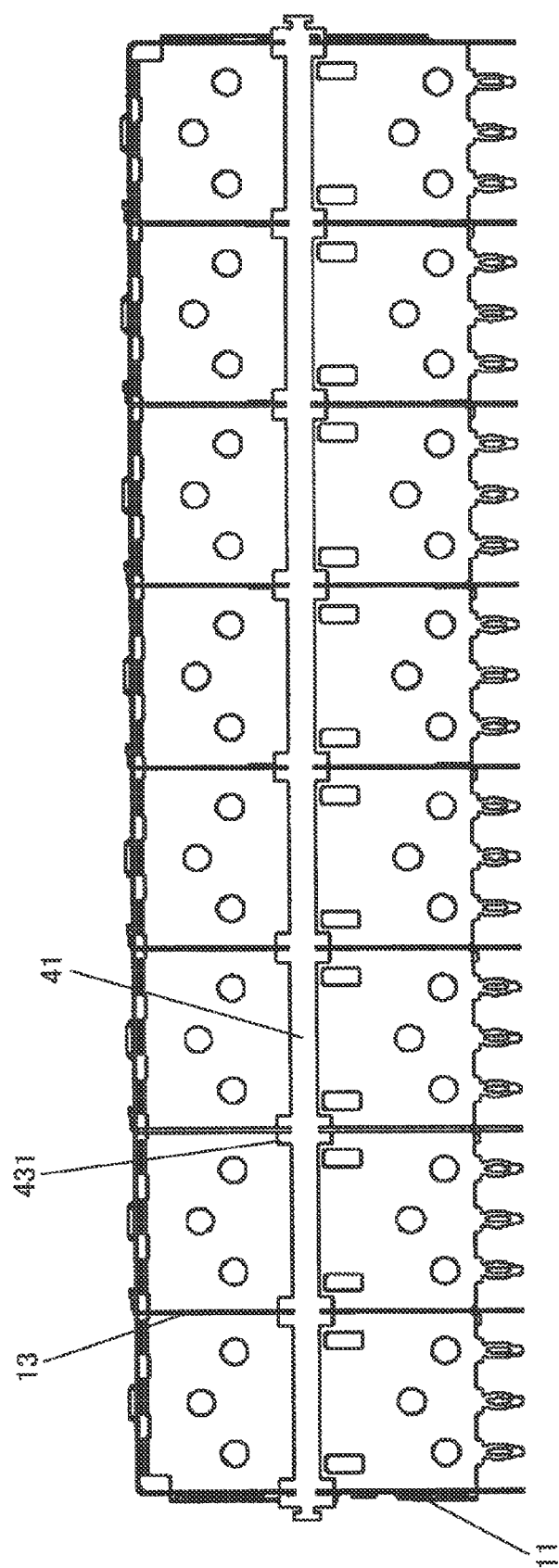
FIG. 16 is a cross-sectional view passing through point H of FIG. 4, wherein partitions are removed.
Figure 20B:
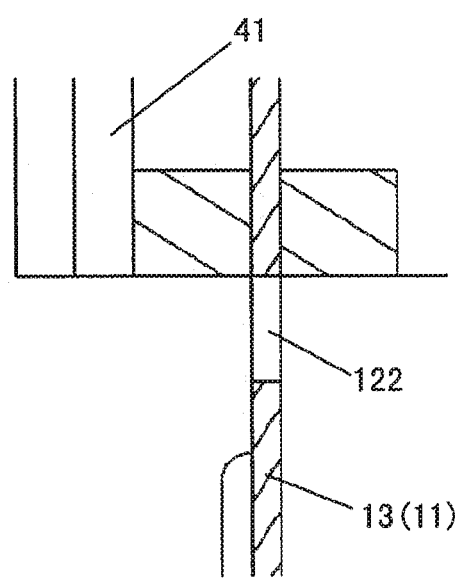
FIG. 20B is another schematic view of the connection between the heat conduction body and the partition plate, with the protrusion of the heat conduction body being separated from the vertical receiving passageway of the partition plate.

Next, referring to FIG. 20B, the heat conduction body 41 is pushed backward in the longitudinal direction, and then a portion of the sidewall 11 or the partition plate 13 will enter into the positioning slot 432 gradually; as shown in FIG. 21B, due to the elasticity of the connection portion 441, the first catch 442 of the locating device 44 will be offset along with the longitudinal movement of the heat conduction body 41 and then enter into the location portion 113 of the sidewall 11, such that the front-back movement of the heat conduction body 41 in the longitudinal direction is confined. At this time, the cage 1 is assembled, as shown in FIG. 4. If the structure of the cage 1 as shown in FIG. 4 is sectioned at the point H (i.e. at every connection device 43) in FIG. 4, the plan view as shown in FIG. 16 will be obtained. It is noted that for easily understanding the connection state of the heat conduction body 41 with the partition plates 13 and the sidewalls 11, the partition sections 3 of the FIG. 16 is omitted.

Next, referring to FIGS. 4, 22-25B, the back end of the engagement groove 53 of the heat dissipation device 5 aligns with the front end of the engagement rail 45, and then the engagement rail 45 slides in the engagement groove 53. As shown in FIG. 25A, during the sliding of the engagement rail 45 in the engagement groove 53, the second catch 443 of the locating device 44 also slides in the engagement groove 53; as sliding further, as shown in FIG. 25B, the second catch 443 will cross a partition portion 56 and enter into the positioning groove 54 so as to prevent the front-back movement of the heat dissipation device 5 with respect to the heat conduction body 41 in the longitudinal direction. In this way, the heat dissipation device 5 is installed on the heat conduction body 41, so as to form the connector of the invention. It is appreciated that, the positioning groove may be omitted, and the second catch 443 may be positioned by the edge of the base portion 51.

Lastly, as shown in FIG. 1, a plug 2 is inserted into the connector. During the insertion of the plug 2 into a receiving passageway 14, the protection case 21 of the plug 2 comes into contact with the heat conduction block 33 smoothly by the slop structure on the heat conduction block 33. When the plug 2 is installed in the proper position and comes into contact with the receptacle installed in the connector, the protection case 21 of the plug 2 presses the heat conduction block 33 of the partition section 3. The heat conduction block 33 in turn presses the elastic heat conduction pad 42, and makes the heat conduction pad 42 contract, so that the protection case 21, the heat conduction block 33, the heat conduction pad 42 and the heat conduction body 41 are tightly held, and the heat generated by the photoelectric conversion module 22 and other chips may be transferred to the heat conduction body 41 and dissipated efficiently to the air outside of the cage 1 of the connector by the heat dissipation device 5.

According to a further embodiment of the invention, a heat conduction assembly 4 is provided and includes the heat conduction body 41 as mentioned in any one of the above embodiments, and the heat conduction pad 42 as mentioned in any one of the above embodiments, wherein each heat conduction pad 42 engages both upper and lower side of the heat conduction body 41. The heat conduction assembly 4 also includes a plurality of heat conduction blocks 33 each configured to be attached to the external surface of the respective heat conduction pad 42. When the heat conduction pad 42 is not inserted into the connector, it has the normal thickness; but when it is inserted into the plug 2, the heat conduction block 33 will come into contact with the protection case 21 of the plug 2, so as to displace the heat conduction block 33 by 0.175-0.35 mm. This displacement is transferred to the heat conduction pad 42 and causes it to be compressed. The heat conduction body 41 provides the counterforce of the compressing force, and supports the heat conduction pad 42. The heat conduction pad 42 engages the receiving groove 411. In this way, the contact area of the heat conduction pad 42 and the heat conduction block 33 is increased, thereby reducing the thermal contact resistance and improving the efficiency of the heat conduction.

According to an embodiment of the invention, if the extreme compression rate of the heat conduction pad is a % and the shrinkage needed to be provided by the heat conduction pad is b, the range of thickness w of the heat conduction pad is about b/(a %)<w<b/(0.8a %). Because the heat conduction coefficient of the heat conduction pad is lower than that of metal heat conduction block, in order to obtain the best effect, the thickness of the heat conduction pad is set as small as possible and subjected to the extreme shrinkage that may be provided. The heat conduction pad is compressed to reduce the thermal resistance and thus increase the performance of the heat conduction. For example, if the shrinkage needed to be provided is a mm, and the extreme compression rate of the heat conduction pad is 65%, then the thickness of the heat conduction pad may be set within a range of a/0.65~a/0.52.

The connector and the heat conduction assembly according to an embodiment of the invention may be applied to 2×6, 2×8 or 2×12 type of connector. Since the heat conduction body of the heat conduction apparatus crosses the connector in the lateral direction, a heat conduction path having a bridge-shape is formed along the width of the connector, and the temperature at downstream of the air flow passing through the connector may be reduced, and thus the temperature of the date communication module may be reduce significantly, improving the working performance of the connector.

Further, by installing the heat dissipation devices along two sides of the cage, the problem that, in a connector having two or more columns receiving passageways, the thermal resistance of the connector is relatively large because dissipation fins cannot be mounted on a top of the connector due to the strict limitation of height is eliminated. Due to the sandwich structure applied by the partition, in the case that only single column plugs are inserted, the fine contact between the plug and the partition having the sandwich structure is held.

In an exemplary embodiment of the invention, the connector may be a photoelectric conversion device, and a data communication module provided in the plug may be a photoelectric chip with a photoelectric conversion function. The heat transfer simulation is performed on the 2*4 type SFP+ connector, and the result is as follows: in the case that the heat dissipation devices are provided on the two sides of the heat conduction body, the highest temperature of the photoelectric chip may be reduced by at least 40° C., and in the case that the heat dissipation devices are not provided on the two sides of the heat conduction body, the highest temperature of the photoelectric chip may be reduced by 32° C. Thus, the connector of the invention may reduce the temperature of the photoelectric chip of the plug inserted into the connector, and thus improving the photoelectric conversion efficiency of the photoelectric chip.

The connector and the heat conduction assembly according to various embodiments of the invention may be applied to 2×6, 2×8 or 2×12 type of connector. Since the heat conduction body of the heat conduction apparatus crosses the connector in the lateral direction, a heat conduction path having a bridge-shape is formed along the width of the connector, and the temperature at downstream of the air flow passing through the connector may be reduced. The temperature of the date communication module may be reduced significantly, thereby improving the working performance of the connector.

It should be appreciated for those skilled in this art that the above embodiments are intended to be illustrative. Many modifications may be made to the above embodiments by those skilled in this art, and various features described in different embodiments may be freely combined with each other without conflicting in configuration or principle, such that on the basis of solving the problem of the invention, various connectors, the connector including the connectors, and the heat conduction apparatus may be accomplished.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector for receiving a plurality of plugs therein, comprising:
    a cage having a plurality of plug receiving passageways arranged along two rows stacked on top of each other;
    a plurality of partition plates, each of the plurality of partition plates positioned between two laterally adjacent plug receiving passageways of the plurality of plug receiving passageways;
    a plurality of partition sections, each of the plurality of partition sections positioned between two adjacent plug receiving passageways of the plurality of plug receiving passageways; and
    a heat conduction apparatus penetrating through the plurality of partition sections along a width thereof, the heat conduction apparatus including a heat conduction body extending along a width of the cage and a plurality of heat conduction pads engageable to both upper and lower sides of the heat conduction body.

2. The connector according to claim 1, wherein the plurality of heat conduction pads come into contact with a portion of one respective partition of the plurality of partition sections.

3. The connector according to claim 2, wherein the plurality of heat conduction pads are made of rubber material doped with metal particle.

4. The connector according to claim 2, wherein the heat conduction body has a substantially rectangular shape.

5. The connector according to claim 2, further comprising a plurality of receiving grooves disposed along both the upper and lower sides of the heat conduction body, respectively.

6. The connector according to claim 5, wherein each of the plurality of heat conduction pads compressibly engage the plurality of receiving grooves respectively.

7. The connector according to claim 6, wherein each of the plurality receiving grooves is provided with a plurality of ribs having a resilient member thereon.

8. The connector according to claim 7, wherein each of the plurality of heat conduction pads include an engagement hole through which the resilient member passes.

9. The connector according to claim 5, wherein the heat conduction apparatus further includes a plurality of connection devices configured to engage one of opposite sidewalls of the cage and the plurality of partition plates.

10. The connector according to claim 9, wherein the plurality of connection devices are positioned on a first side of the heat conduction body.

11. The connector according to claim 10, wherein the plurality of receiving grooves are provided between adjacent connection devices of the plurality of connection devices.

12. The connector according to claim 11, wherein each of the plurality of connection devices include a protrusion extending outward from the first side.

13. The connector according to claim 12, wherein each of the plurality of connection devices further includes a positioning slot disposed in the protrusion.

14. The connector according to claim 13, further comprising a horizontal receiving passageway and a vertical receiving passageway formed along one of the opposite sidewalls and each of the plurality of partition plates.

15. The connector according to claim 14, wherein the vertical receiving passageway communicates with the horizontal receiving passageway.

16. The connector according to claim 15, wherein the heat conduction body is passable through the horizontal receiving passageway.

17. The connector according to claim 15, wherein the protrusion is passable through the vertical receiving passageway.

18. The connector according to claim 17, wherein the heat conduction apparatus further includes a locating device having a connection portion protruding outward from one end opposite to the first side of the heat conduction body.

19. The connector according to claim 18, wherein the locating device further includes a first catch disposed along a free end of the connection portion.

20. The connector according to claim 19, further comprising a heat dissipation device mounted outside of one of the opposite sidewalls of the cage and engageable with the heat conduction apparatus.

21. The connector according to claim 20, wherein the heat dissipation device is installed along a side of the heat conduction body.

22. The connector according to claim 21, wherein, the heat dissipation device includes a base portion having a flat-plate shape, a plurality of heat dissipation fins provided along a first surface of the base portion, and an engagement groove extending along a second surface of the base portion.

23. The connector according to claim 22, wherein the heat conduction body includes an engagement rail slidable in the engagement groove.

24. The connector according to claim 22, wherein the second surface includes a positioning groove separated from the engagement groove.

25. The connector according to claim 24, wherein the free end of the connection portion further includes a second catch opposite the first catch and engageable with the positioning groove.

26. The connector according to claim 25, wherein the engagement groove includes a receiving groove.

27. The connector according to claim 1, wherein, each of the plurality of partition sections is substantially U-shape and includes a pair of support arms.

28. The connector according to claim 27, wherein each of the plurality of partition sections further includes a pair of location openings disposed on the pair of support arms and a heat conduction block insertable into one of the pair of location openings from an interior of the pair of support arms.

29. The connector according to claim 28, further comprising a pair of steps disposed on the heat conduction block.

30. The connector according to claim 29, wherein interior edges of the pair of location openings are positioned on the pair of steps to form a boss between the pair of steps.

31. A heat conduction assembly, comprising:
a heat conduction body;
a plurality of heat conduction pads engagable to both upper and lower sides of the heat conduction body; and
a plurality of receiving grooves disposed along both the upper and lower sides of the heat conduction body, respectively.

32. The heat conduction assembly according to claim 31, wherein the plurality of heat conduction pads are made of rubber material doped with metal particle.

33. The heat conduction assembly according to claim 31, wherein the heat conduction body has a substantially rectangular shape.

34. The heat conduction assembly according to claim 31, wherein each of the plurality of heat conduction pads compressibly engage the plurality of receiving grooves respectively.

35. The heat conduction assembly according to claim 34, wherein each of the plurality receiving grooves is provided with a plurality of ribs having a resilient member thereon.

36. The heat conduction assembly according to claim 35, wherein each of the plurality of heat conduction pads include an engagement hole through which the resilient member passes.

37. The heat conduction assembly according to claim 36, further comprising a plurality of connection devices positioned on a first side of the heat conduction body.

38. The heat conduction assembly according to claim 37, wherein the plurality of receiving grooves are provided between adjacent connection devices of the plurality of connection devices.

39. The heat conduction assembly according to claim 38, wherein each of the plurality of connection devices include a protrusion extending outward from the first side.

40. The heat conduction assembly according to claim 39, wherein each of the plurality of connection devices further includes a positioning slot disposed in the protrusion.

41. The heat conduction assembly according to claim 31, wherein the heat conduction apparatus further includes a locating device having a connection portion protruding outward from one end thereof opposite to a first side of the heat conduction body.

42. The heat conduction assembly according to claim 41, wherein the locating device further includes a first catch disposed along a free end of the connection portion.

43. The heat conduction assembly according to claim 31, further comprising a heat dissipation device mounted along one side of the heat conduction body and extending longitudinally thereof direction.

44. The heat conduction assembly according to claim 43, wherein the heat dissipation device includes a base portion, a plurality of heat dissipation fins provided along a first surface of the base portion, and an engagement groove extending along a second surface of the base portion.

45. The heat conduction assembly according to claim 44, wherein the heat conduction body includes an engagement rail slidable in the engagement groove.

46. The heat conduction assembly according to claim 45, wherein the second surface further includes a positioning groove separately positioned from the engagement groove.

47. The heat conduction assembly according to claim 46, further comprising a connection portion protruding outwards from the heat conduction body and having a second catch engageable with the positioning groove.

48. The heat conduction assembly according to claim 31, further comprising a plurality of heat conduction blocks attachable to outer surfaces of the plurality of heat conduction pads.

49. A connector, comprising:
a cage having a plurality of plug receiving passageways arranged in a pair of rows stacked on top of each other and separated into at least two columns; and
a heat conduction apparatus penetrating through the at least two columns to form a heat conduction path, the heat conduction apparatus including a heat conduction body extending laterally thereof and a plurality of heat conduction pads configured engaged to both upper and lower sides of the heat conduction body.

50. The connector according to the claim 49, further comprising a partition section provided between the pair of rows.

* * * * *